Patented Dec. 18, 1951

2,579,332

UNITED STATES PATENT OFFICE 2,579,332

METHOD FOR INCREASING THE VISCOSITY OF LIQUID RESINOUS ORGANOPOLYSILOXANES

Henry C. Nelson, Jr., Schenectady, N. Y., assignor to General Electric Company, a corporation of New York No Drawing. Application February 11, 1950, Serial No. 143,824

2 Claims. (Cl. 260—33.4)

The present invention relates to polysiloxane resins having increased viscosity and stability. It is particularly concerned with a method for increasing the viscosity of a liquid organopolysiloxane resin by heating a lower viscosity resin with a minor proportion of zinc oxide until an organopolysiloxane of higher viscosity and molecular weight is obtained.

Polysiloxane resins of the type with which the present invention is concerned are described, for example, in U. S. Patents 2,258,218–222 of Eugene G. Rochow. These resins comprising a plurality of hydrocarbon-substituted silicon atoms linked by oxygen atoms are prepared, for example, by hydrolysis and condensation of a mixture of organosilicon halides. The commercially useful products containing an average of more than 1.0 and less than 2, preferably from about 1.1 to 1.7, hydrocarbon radicals per silicon atom are soluble in various solvents, and are converted to the hardened state when heated at elevated temperatures.

The present invention is based on the discovery that small amounts of zinc oxide can be used to increase the viscosity of liquid, heat-hardenable polysiloxane resins to give higher viscosity resins which permit heavier films to be applied in one operation in the case of dipping or spray coating. In addition, the organopolysiloxane resins of increased viscosity are quite stable at room temperatures and give improved films as evidenced by the superior craze resistance and flexibility of heat-converted films thereof.

Heretofore little success has been realized in producing silicone resin solutions of more than 50 per cent solids concentration, for instance, from 60 to 70 per cent solids, with a viscosity much over 200 to 300 centipoises. The silicone resin or organopolysiloxane resin solution as it approached about 300 centipoises would become unstable and eventually proceeded to gel at room temperature. Furthermore, the characteristics of the unbodied resins when baked out as films were generally inferior due to their undesirable brittleness under shock conditions. The higher viscosity resin solutions have been desirable in order to prevent excessive dripping of films obtained by either dipping a surface in the resin solution or spray coating the surface with the resin solution. Although attempts have been made to overcome the foregoing difficulties, they have not met with much success not only because of the disadvantages described above but also because of the difficulty in controlling the degree and rate of increase of viscosity of the liquid organopolysiloxane resin.

I have now discovered that I am able to body or increase the viscosity and molecular weight of liquid organopolysiloxane resins by heating the resin in the presence of zinc oxide for a period of time sufficient to effect the desired increase in viscosity. The amount of zinc oxide used may be varied, but I have found it advantageous to use a minor proportion of zinc oxide. Good results may be obtained when from 0.01 to 10 per cent, by weight, especially from 0.05 to 5 per cent, by weight, zinc oxide, based on the weight of the organopolysiloxane resin, is employed.

The reaction whereby the increase in viscosity is accomplished may be conducted in any of several ways. One method comprises dissolving the liquid organopolysiloxane resin in a suitable solvent, adding the zinc oxide to this solution and heating the mixture for a time and temperature sufficient to effect the viscosity increase. Apparently some condensation reaction occurs since I have found that a small amount of water is formed during the heating period, and for this purpose during the reaction I have attached a water trap to the refluxing mixture to catch any water which may be formed.

Among the solvents which I have found suitable for employing in my invention are, for example, aromatic solvents, for instance, benzene, toluene, xylene, etc.; inert halogenated hydrocarbons, high boiling hydrocarbons, for example, high boiling fractions of petroleum spirits, etc. The particular solvent employed is not critical and the only desirable properties of the solvent should be that it is inert during the heating of the organopolysiloxane resin and that it has a sufficiently high boiling point, for example, from 75° to 200° C. or even higher within which suitable refluxing of the mixture of organopolysiloxane resin, solvent and zinc oxide can take place with the resultant removal of any formed water without the need for confining the mixture under pressure.

As will be apparent to those skilled in the art, the time and temperature within which the heating operation is conducted may be varied within wide limits without departing from the scope of the invention. At temperatures of the order of 100° to 200° C., I have found that from 2 to 10 hours have been in most cases adequate although longer periods of time and higher and lower temperatures may also be employed depending on the conditions of the reaction, the amount of zinc oxide used, the degree of dilution of the resin solution, the particular reactivity of the organopolysiloxane resin, etc. Generally, when a 60 to 70 per cent solution of the organopolysiloxane in the solvent is employed, it is desirable that the viscosity of such solution range from about 4 to 600 centipoises or higher as a result of the bodying of the organopolysiloxane resin.

After the increase in viscosity has been effected, the zinc oxide is advantageously, although not necessarily, removed from the refluxed mixture, for instance, by filtration. I have found that when glycerine is added to the bodied reaction mixture in at least a molecular equivalent to the zinc oxide, the latter may be filtered from the bodied resin much more easily. In addition, if bodying is conducted in the presence of glycerine, the desired viscosity is obtained much sooner.

The bodied organopolysiloxane resins obtained in accordance with my invention may be used for coating various surfaces and electrical conductors. Because of their increased viscosity, such bodied resins are more tenacious and tend to drain less from sprayed or coated surfaces.

In order that those skilled in the art may better understand how the present invention may be practiced, the following examples are given by way of illustration and not by way of limitation. All parts are by weight.

Example 1

A mixture of chlorosilanes having the following formulation

|  | Parts |
| --- | --- |
| $CH_3SiCl_3$ | 183 |
| $(CH_3)_2SiCl_2$ | 312 |
| $C_6H_5SiCl_3$ | 509 | was hydrolyzed in accordance with the method disclosed and claimed by Charles D. Doyle in application Serial No. 767,342, filed August 7, 1947, now Patent Number 2,542,641, and assigned to the same assignee as the present invention. The isolated organopolysiloxane resin was dried and 350 parts of the resin were mixed with 234 parts petroleum spirits to make a resinous solution and the latter mixed with 0.218 part zinc oxide. This latter mixture was heated in a flask equipped with a condenser under total reflux. A water trap was provided to remove any water of condensation which might result. The mixture was heated at about 165° C. for 4 hours. At the end of this time about 2 parts water had been collected and the viscosity had increased to 550 centipoises from the original viscosity of the unbodied resin which was around 6 centipoises. The speed of bodying or polymerization can be increased by decreasing the solvent.

The bodied resin prepared above showed excellent stability and shelf life even when stored at 50° C. Storage after long periods of time failed to give any appreciable or measurable increase in viscosity of the product. Baked films of this material were superior in craze resistance to baked films of the unbodied resin. As far as I am aware, this is the first time that an organopolysiloxane resin solution of this type has exhibited improved properties and good stability when the resin has been bodied to a viscosity above 400 centipoises.

Example 2

In this example 3000 parts of the resinous solution described in Example 1 were mixed with 1.038 parts zinc oxide and 1.482 parts glycerine. This mixture which had an original viscosity of around 15 cp. was heated at the reflux temperature (around 160° to 167° C.) of the mass using the same equipment as described in Example 1 for about 6 hours to give a bodied resin having a viscosity of about 950 cp. This bodied resin solution was mixed with an amount of titanium dioxide equal in weight to the weight of the resinous solids in the bodied resin and thereafter diluted with petroleum spirits to give a paint containing 63 per cent total solids. To this paint was added 0.5 per cent, by weight, zinc octoate, based on the resinous solids and the mixture sprayed on a steel panel to a film thickness of about 1.2–1.5 mils and thereafter baked for 1 hour at 200° C.

As a control the resinous solution described above, but not subject to the heat treatment and not containing either the zinc oxide or glycerine, was mixed with titanium dioxide in the same proportion as above, diluted with petroleum spirits to form a 63 per cent total solids solution, and to this paint was added the same amount, by weight, of zinc octoate. This paint was also sprayed on a steel panel to a thickness of from 1.2–1.5 mils, and baked for 1 hour at 200° C.

Each of the two panels described above, that is, the panels using bodied and unbodied resins, was placed in an oven maintained at 260° C. for a length of time sufficient to determine when the first evidence of crazing of the surface occurred. As a result of this test, it was found that the film prepared from the bodied resin had a craze life (that is, did not show craze marks) of about 80 per cent better than the film using the unbodied resin. It was also found, unexpectedly, that the addition of about 10 percent, by weight, zinc oxide, based on the weight of the $TiO_2$, to the bodied resin gave a craze life which was about 3⅓ times longer than the craze life of the film using the unbodied resin. This was most unusual since the addition of the same amount of zinc oxide to the unbodied resin failed to give scarcely any improvement in the craze life.

The following examples illustrate the advantages realized in using glycerine and zinc oxide during the bodying operation.

Example 3

In this example 3000 parts of the same resinous solution employed in Example 1 were mixed with 1.482 parts glycerine and the mixture heated for about 40 hours at 166° to 175° C. (the reflux temperature of the mass) to give a viscosity of the resin solution of about 65 cp. This increase in viscosity was only a slight improvement over the viscosity of the original resin solution prior to heating. A paint was made up in the same manner as in Example 2 using the same proportions of ingredients and using the same amount of zinc octoate as the curing agent.

Example 4

The resinous solution described in Example 1 was heated alone without glycerine and without zinc oxide for 40 hours at the reflux temperature of the mass. At the end of this time it was found that no noticeable increase in viscosity was obtained. A paint was made up in the same manner as in Example 2 using the same proportion of ingredients and zinc octoate as therein described.

Example 5

In this example 3000 parts of the resinous solution described in Example 1 were mixed with 1.482 parts glycerine and 1.308 parts zinc oxide and the mixture heated for 19 hours at 166° to 175° C. to give a bodied resin having a viscosity of about 550 cp. This bodied resin was mixed with titanium dioxide and zinc octoate in the same proportions as employed in Example 2 to form a paint.

The paints prepared in Examples 3 to 5 as well as a further control comprising a paint prepared from the unbodied methyl phenyl polysiloxane resinous solution were sprayed on steel panels to a thickness of about 1.2-1.5 mils and baked for 1 hour at 200° C. Each panel was then tested for craze life at 260° C. with the following results:

1. The panel coated with the paint prepared in Example 3 crazed after 250 hours.
2. The panel coated with the paint described in Example 4 began to show extensive crazing before 250 hours.
3. The panel employing a paint made from the unbodied (i. e., non-heated and non-treated resin) resin crazed in about 150 hours.
4. The panel prepared using the paint described in Example 5 showed no evidence of crazing even after 500 hours.

While the invention has been described with particular reference to a methyl phenyl polysiloxane resin, it is to be understood that it is broadly applicable to any soluble polysiloxane resin in which the hydrocarbon radicals attached to silicon in the polysiloxane linkage may be, for instance, aliphatic radicals (e. g., alkyl, for example, methyl, ethyl, propyl, butyl, isobutyl, decyl, etc.; vinyl, allyl, etc.), aryl (e. g., phenyl, naphthyl, anthracyl, etc.), alkaryl (e. g., tolyl, xylyl, ethylphenyl, etc.), aralkyl (e. g., benzyl, phenylethyl, etc.), cycloaliphatic (e. g., cyclopentyl, cyclohexyl, cyclohexenyl, etc.), etc. radicals. Such resins may also contain two or more different radicals attached to the silicon atom as, for example, methylphenyl-organopolysiloxane resins. If desired, hydrocarbon radicals may be substituted with non-reactive substituents as, for example, halogen, etc.

The bodied resins may be mixed with small amounts of different cure accelerators prior to application to various surfaces. Thus, metal salts of organic acids soluble in such bodied resins as, for instance, those more particularly disclosed in Welsh Patent 2,449,572, issued September 21, 1948, and assigned to the assignee of the present invention, may be used.

The bodied polysiloxane resins may also be used in combination with various fillers such as glass fibers, cotton cloth, asbestos fibers, etc., from which molded products may be prepared. If desired, dyes and pigments such as, for instance, lithopone, titanium dioxide, etc., may be added to the bodied resin prior to its use in various coating applications.

What I claim as new and desire to secure by Letters Patent of the United States is:

1. The process which comprises (1) forming a solution in an inert solvent of a heat-convertible liquid hydrocarbon-substituted polysiloxane in which the hydrocarbon groups are attached to the silicon atoms by C-Si linkages and are selected from the class consisting of alkyl, aryl, alkaryl, and aralkyl radicals, (2) adding to said solution (a) from 0.01 to 10%, by weight, zinc oxide based on the weight of the aforesaid polysiloxane and (b) glycerine in at least a molar equivalent to the amount of zinc oxide employed, and (3) heating the aforesaid solution at a temperature of from 100° to 200° C. until a resinous solution of higher viscosity is obtained.

2. The process which comprises (1) forming a solution in an inert solvent of a methyl phenyl polysiloxane resin in which the methyl and phenyl groups are attached to the silicon atoms by C-Si linkages, (2) adding to the said solution (a) from 0.01 to 10%, by weight, zinc oxide based on the weight of the aforesaid polysiloxane resin and (b) an amount of glycerine at least in a molar equivalent to the amount of zinc oxide incorporated, and (3) heating the solution at a temperature of from 100° to 200° C. until a resinous solution of higher viscosity is obtained.

HENRY C. NELSON, JR.

REFERENCES CITED

The following references are of record in the file of this patent:

UNITED STATES PATENTS

| Number | Name | Date |
|---|---|---|
| 2,389,477 | Wright | Nov. 20, 1945 |
| 2,457,539 | Elliot et al. | Dec. 28, 1948 |
| 2,467,853 | Poskitt et al. | Apr. 19, 1949 |
| 2,482,276 | Hyde | Sept. 20, 1949 |
| 2,495,306 | Zurcher | Jan. 24, 1950 |
| 2,501,525 | Krieble et al. | Mar. 21, 1950 |
| 2,528,606 | Pedersen | Nov. 7, 1950 |

FOREIGN PATENTS

| Number | Country | Date |
|---|---|---|
| 606,301 | Great Britain | Aug. 11, 1948 |